United States Patent
Matsuyama

(10) Patent No.: US 8,262,065 B2
(45) Date of Patent: Sep. 11, 2012

(54) CORD ALIGNING DEVICE

(75) Inventor: Fumihiro Matsuyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 664 days.

(21) Appl. No.: 12/308,252

(22) PCT Filed: Apr. 10, 2007

(86) PCT No.: PCT/JP2007/057886
§ 371 (c)(1),
(2), (4) Date: May 29, 2009

(87) PCT Pub. No.: WO2007/145013
PCT Pub. Date: Dec. 21, 2007

(65) Prior Publication Data
US 2010/0170073 A1    Jul. 8, 2010

(30) Foreign Application Priority Data
Jun. 15, 2006    (JP) .................................. 2006-166034

(51) Int. Cl.
*H02G 1/08* (2006.01)
(52) U.S. Cl. ...................... 254/134.3 FT; 254/134.3 R
(58) Field of Classification Search ......... 254/134.3 FT, 254/134.3 R; 156/117, 397; 152/526, 527; 29/281.5; 234/134.3 FT, 134.3 R
See application file for complete search history.

(56) References Cited

U.S. PATENT DOCUMENTS

| | | | |
|---|---|---|---|
| 4,150,929 A | 4/1979 | Brandt | |
| 4,295,812 A | 10/1981 | Hoddinott | |
| 6,167,934 B1 * | 1/2001 | Debroche | 156/397 |
| 6,969,440 B2 * | 11/2005 | Takagi | 152/554 |
| 2002/0195186 A1 | 12/2002 | Takagi | |
| 2003/0096095 A1 * | 5/2003 | Abdallah | 156/117 |
| 2009/0301639 A1 * | 12/2009 | Kudo et al. | 156/117 |
| 2010/0024987 A1 * | 2/2010 | Saine et al. | 156/439 |

FOREIGN PATENT DOCUMENTS

| | | |
|---|---|---|
| EP | 0 503 541 A1 | 9/1992 |
| FR | 2 101 168 | 3/1972 |
| FR | 2 682 635 A1 | 4/1993 |
| JP | A-04-043304 | 2/1992 |
| JP | A-06-106595 | 4/1994 |
| JP | A-2003-053855 | 2/2003 |
| JP | A-2005-246735 | 9/2005 |
| JP | A-2006-007428 | 1/2006 |

OTHER PUBLICATIONS

Jul. 26, 2012 Search Report issued in European Patent Application No. 07741322.7.

* cited by examiner

*Primary Examiner* — Hadi Shakeri
(74) *Attorney, Agent, or Firm* — Oliff & Berridge, PLC

(57) ABSTRACT

A cord aligning device formed with a plurality of guide holes allowing cords to be separately inserted therethrough is provided. Each of the guide holes includes a feed port into which a cord is fed, a delivery port from which the cord is delivered, an introducing portion provided continuously with the feed port, and a delivery portion provided between the introducing portion and the delivery port. The introducing portion is formed such that the area of a cross-section vertical to a centerline thereof is reduced gradually toward the delivery portion from the feed port, the area of a cross-section of the delivery portion vertical to a centerline thereof is uniform along the centerline over its total length, and the delivery portion is formed in a linear fashion. Moreover, the delivery portions of the plurality of guide holes are juxtaposed in a predetermined direction so as to form rows parallel to each other.

7 Claims, 3 Drawing Sheets

CORD ALIGNING DEVICE

TECHNICAL FIELD

The present invention relates to a cord aligning device which aligns a plurality of cords formed of, for example an organic fiber, metal in the same direction. Priority is claimed on Japanese Patent Application No. 2006-166034, filed Jun. 15, 2006, the content of which is incorporated herein by reference.

BACKGROUND ART OF THE INVENTION

Conventionally, a beltlike material reinforced by a linear member (hereinafter referred to as a cord) formed of, for example, rubber and made of, for example, an organic fiber, metal is used for, for example, carcass plies of a pneumatic tire. The beltlike material reinforced by such cords is manufactured as follows, using a cord aligning device which has a plurality of guide holes which are juxtaposed so as to form rows parallel to each other. That is, a cord is fed into each guide hole through a feed port, and is delivered through a delivery port from the guide hole. Thereby, a plurality of cords are aligned so as to form rows parallel to each other after the arrangement of the plurality of guide holes. Moreover, a rubber material which forms the beltlike material is delivered to both sides of a cord, simultaneously as a cord is delivered a cord through a delivery port from a guide hole, thereby covering the cord. Thereby, a plurality of cords are covered with a rubber material while they are aligned, and a beltlike material is manufactured eventually (for example, refer to Patent Document 1).

PATENT DOCUMENT 1: Japanese Unexamined Patent Application Publication No. 6-106595

DETAILED DESCRIPTION OF THE INVENTION

Problems to be Solved by the Invention

However, in the above conventional technique, when a cord is continuously fed into each guide hole of the cord aligning device through the feed port and is delivered through the delivery port from the guide hole, the cord may contact the edge of the feed port, and may be broken.

The invention has been made in view of the above-mentioned situation, and the object thereof is to provide a cord aligning device capable of regularly arraying a plurality of cords, and preventing breaking of the arrayed cords.

Means for Solving the Problem

In order to solve the above problems, the invention suggests the following means.

The cord aligning device of the invention is a cord aligning device formed with a plurality of guide holes allowing cords to be separately inserted therethrough. Each of the guide holes includes a feed port into which a cord is fed, a delivery port from which the cord is delivered, an introducing portion provided continuously with the feed port, and a delivery portion provided between the introducing portion and the delivery port. The introducing portion is formed such that the area of a cross-section vertical to a centerline thereof is reduced gradually toward the delivery portion from the feed port. The area of a cross-section of the delivery portion vertical to a centerline thereof is uniform along the centerline over its total length. The delivery portion is formed in a linear fashion. The delivery portions of the plurality of guide holes are juxtaposed in a predetermined direction so as to form rows parallel to each other.

According to the cord aligning device of the invention, the introducing portion of the guide hole are formed such that the area of a cross-section vertical to the centerline thereof is reduced gradually toward the delivery portion from the feed port. That is, the cross-sectional area of the introducing portion on the side of the feed port is larger than the cross-sectional area of the introducing portion on the side of the delivery portion. Thereby, since the cord is less likely to contact the edge of the feed port, the stress to be caused in the cord when the cord contacts the edge of the feed port is reduced. As a result, the cord is fed into the guide hole through the feed port without being broken. Additionally, the introducing portion is formed such that the area of a cross-section vertical to the centerline thereof is reduced gradually toward the delivery portion from the feed port, and is continuous with the delivery portion. This permits the cord to be smoothly guided to the delivery portion from the introducing portion without receiving a strong resistance. Moreover, the area of a cross-section of the delivery portion vertical to a centerline thereof is uniform along the centerline over its total length, and the delivery portion is formed in a linear fashion. Moreover, the delivery portions of the plurality of guide holes are juxtaposed in a predetermined direction so as to form rows parallel to each other. This enables the cords to be delivered through the feed ports from the guide holes after the cords are aligned in a direction in which the delivery portions are lined up at regular intervals.

In the cord aligning device of the invention, an inner surface of the introducing portion may incline at a substantially uniform angle with respect to the centerline of the introducing portion. According to the cord aligning device of the invention, the inner surface of the introducing portion inclines at a substantially uniform angle with respect to the centerline of the introducing portion. Thereby, the cord is guided to the delivery portion from the introducing portion without receiving a strong resistance.

In the cord aligning device of the invention, the inclination angle of the inner surface of the introducing portion with respect to the centerline of the introducing portion may be equal to or more than 1 degree and equal to or less than 45 degrees. According to the cord aligning device of the invention, the inclination angle of the inner surface of the introducing portion with respect to the centerline of the introducing portion is equal to or more than 1 degree and equal to or less than 45 degrees. Thereby, the cord is less likely to contact the edge of the feed port. Thus, the cord is fed into the guide hole without being broken and without strong resistance. Additionally, the guide holes can be formed so that adjacent introducing portions of the plurality of guide holes may not interfere with each other.

In the cord aligning device of the invention, the feed ports of the plurality of guide holes may be arranged such that the positions thereof are shifted alternately in a direction orthogonal to the predetermined direction. According to the cord aligning device of the invention, the feed ports of the plurality of guide holes may be arranged such that the positions thereof are shifted alternately in a direction orthogonal to the predetermined direction. Thereby, the adjacent introducing portions of the plurality of guide holes will not interfere with each other. Additionally, it becomes possible to effectively increase the cross-sectional area of the introducing portion on the feed port. Moreover, the introducing portion is formed such that the area of a cross-section vertical to the centerline thereof reduces gradually toward the delivery portion from the feed port, and is continuous with the delivery portion. This permits the cord to be fed into the guide hole without being broken and without strong resistance. Also, the cords are delivered through the feed ports from the guide holes after the cords are aligned in a direction in which the delivery portions are lined up at regular intervals.

In the cord aligning device of the invention, the edge of the feed port may be chamfered. According to the cord aligning device of the invention, since the edge of the feed port is chamfered, the cord becomes difficult to break even if the cord contacts the edge of the feed port.

In the cord aligning device of the invention, the span length of an end of the introducing portion adjacent to the delivery portion may be equal to or more than 25% and equal to or less than 99% of the span length of the feed port. According to the cord aligning device of the invention, the span length of an end of the introducing portion adjacent to the delivery portion may be equal to or more than 25% and equal to or less than 99% of the span length of the feed port. Thereby, the size of the cross-section of the introducing portion on the side of the delivery portion and the size of the cross-section of the delivery portion are preferably set so that the cords can be aligned at regular intervals. Additionally, the size of the cross-section of the introducing portion on the side of the feed port is preferably set so that the cord may be prevented from contacting the edge of the feed port and being broken. Moreover, the guide holes can be formed so that adjacent introducing portions of the plurality of guide holes do not interfere with each other.

In the cord aligning device of the invention, the length of the delivery portion may be equal to or more than 10% and equal to or less than 70% of the total length of the guide hole. According to the cord aligning device of the invention, the length of the delivery portion may be equal to or more than 10% and equal to or less than 70% of the total length of the guide hole. Thereby, the cord is guided to the delivery portion from the introducing portion without receiving a strong resistance. Additionally, in the delivery portions, the cords can be aligned at regular intervals.

In the cord aligning device of the invention, the cord aligning device may include a feed-port-side member in which the introducing portion is formed, and a delivery-port-side member in which the delivery portion is formed. The feed-port-side member may be combined with the delivery-port-side member such that the introducing portion is continuous with the delivery portion. According to the cord aligning device of the invention, the introducing portion itself includes a feed-port-side member in which the introducing portion is formed, and a delivery-port-side member in which the delivery portion is formed. The feed-port-side member is combined with the delivery-port-side member such that the introducing portion is continuous with the delivery portion. Thereby, it is possible to easily form a guide hole in which the introducing portion is formed such that the area of a cross-section vertical to a centerline thereof is reduced gradually toward the delivery portion from the feed port, and the area of a cross-section of the delivery portion vertical to a centerline thereof is uniform along the centerline over its total length, and the delivery portion is formed in a linear fashion.

Advantageous Effects of the Invention

According to the cord aligning device of the invention, since each of a plurality of guide holes is constituted of an introducing portion and a delivery portion, it is possible to insert a plurality of cords through the guide holes without being broken. Additionally, the plurality of cords can be aligned at regular intervals. Moreover, in manufacturing a beltlike material reinforced by the cords, breaking of a plurality of cords when the cords are aligned can be prevented. As a result, the manufacturing efficiency of the beltlike material can be improved.

DESCRIPTION OF THE REFERENCE SYMBOLS 1, 20: CORD ALIGNING DEVICE
2, 24: FEED PORT
3, 25: DELIVERY PORT
4, 21: GUIDE HOLE
5, 22: INTRODUCING PORTION
5a: CHAMFERED PORTION
5b: END
5c, 5d, 22a: CENTERLINE
6, 23: DELIVERY PORTION
6a, 23a: CENTERLINE
7: FEED-PORT-SIDE MEMBER
8: DELIVERY-PORT-SIDE MEMBER
C: CORD

BEST MODE FOR CARRYING OUT THE INVENTION

Figure 1:
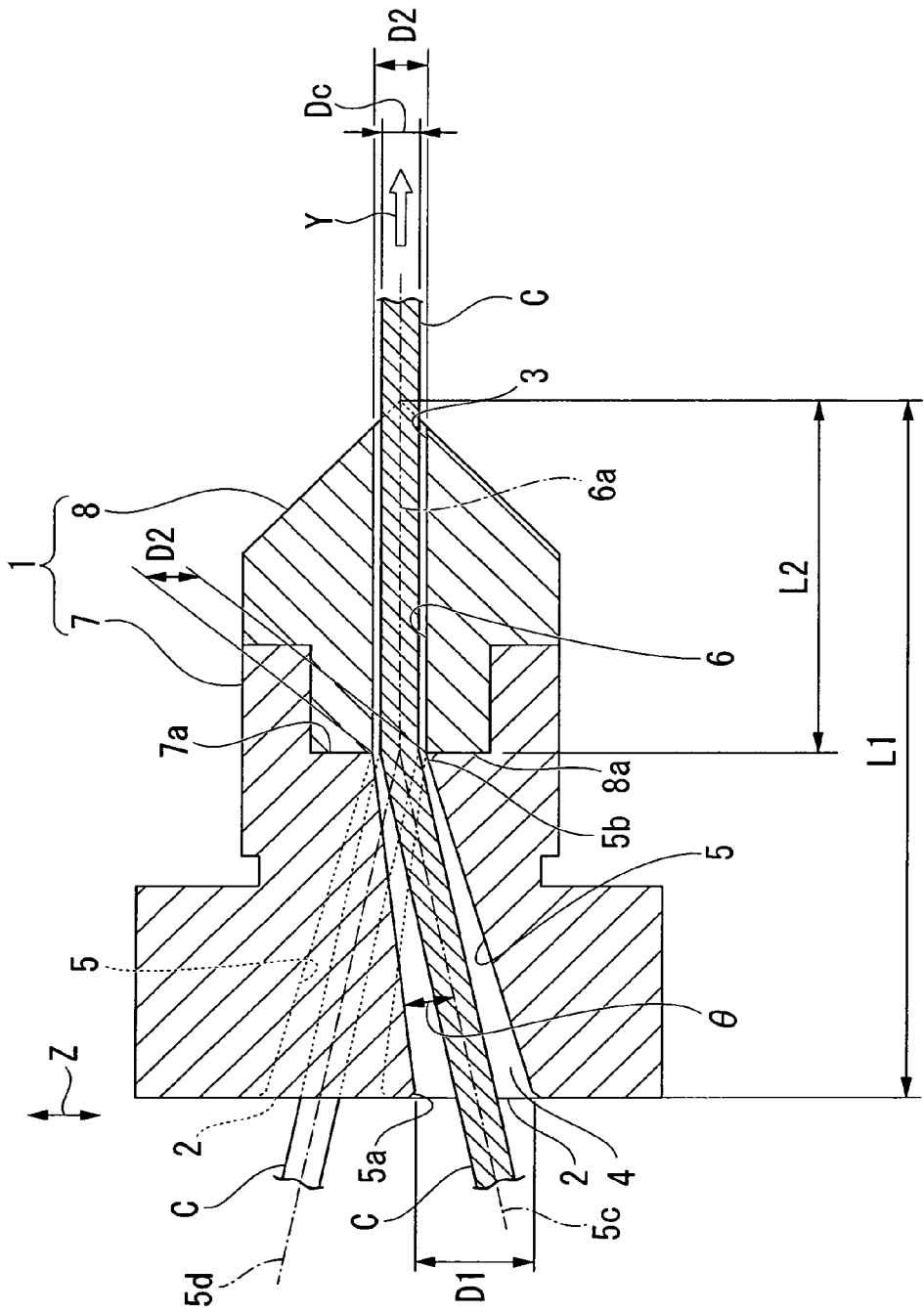
FIG. 1 is a sectional view showing an embodiment of a cord aligning device of the invention when the cord aligning device is seen from a Y-direction.
Figure 2:
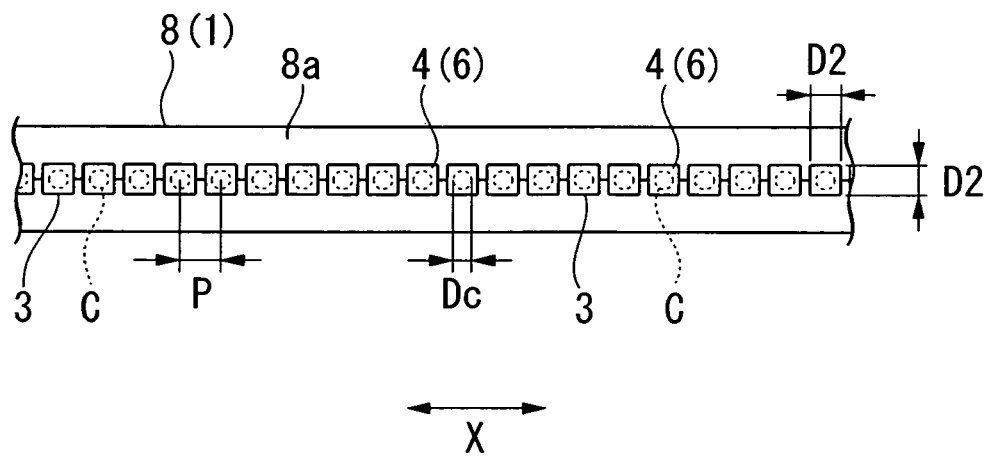
FIG. 2 is a sectional view showing the embodiment of the cord aligning device of the invention when a delivery-port-side member constituting the cord aligning device is seen from the Y-direction.
Figure 3:
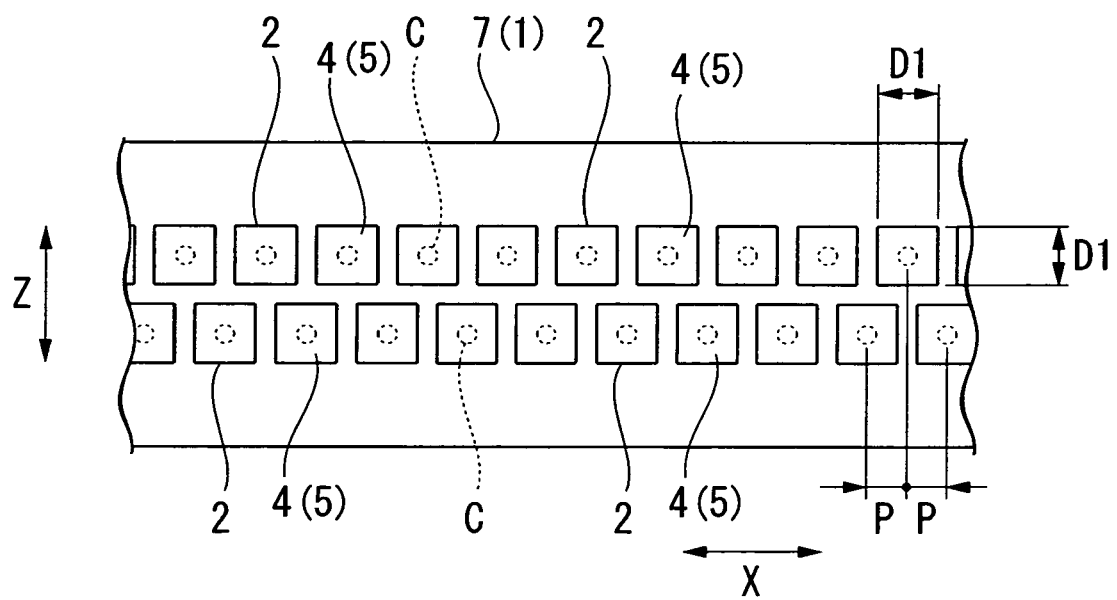
FIG. 3 is a side view showing the embodiment of the cord aligning device of the invention when the cord aligning device is seen from the Y-direction.

FIGS. 1 to 3 show an embodiment of the invention. As shown in FIGS. 1 to 3, a cord aligning device 1 in this embodiment aligns a plurality of cords C formed of, for example, an organic fiber, metal side-by-side at equal intervals in an X-direction in the drawings. A plurality of guide holes 4 through which the cords C can be inserted are formed side-by-side in one row in the X-direction at predetermined intervals P in the cord aligning device 1.

The guide hole 4 includes a feed port 2 into which a cord C is fed, a delivery port 3 from which the cord C is delivered, an introducing portion 5 provided continuously with the feed port 2, and a delivery portion 6 provided between the introducing portion 5 and the delivery port 3. The introducing portion 5 and the delivery portion 6 are all formed such that the cross-sections thereof vertical to centerlines 5c, 5d, and 6a thereof have a square shape. The cord C is fed into the guide hole 4 through the feed port 2, and is delivered sequentially through the delivery port 3. The delivery portion 6 is formed in a linear fashion so as to become substantially parallel to a delivery direction (that is, Y-direction in the drawings) of the cord C toward the delivery port 3 from the end thereof on the side of the feed port 2. In addition, the term "substantially"

means that a manufacturing error is allowed, and the meaning of the "substantially" in the following description is also the same.

As shown in FIG. 2, the delivery portions 6 of the plurality of guide holes 4 extend in the Y-direction, and are arranged in one row in the X-direction at predetermined intervals P so as to form rows parallel to each other. The area of a cross-section of the delivery portion 6 vertical to a centerline 6a thereof is uniform along the centerline over its total length, and the delivery portion is formed in a linear fashion. Specifically, an interval D2 between two faces which face each other among four faces which form the delivery portion 6 is substantially equal from the end of the delivery portion on the side of the feed port 2 to the delivery port 3 in both the X-direction and the Z-direction, and is slightly larger than the external diameter Dc of the cord C.

As shown in FIGS. 1 and 3, the introducing portion 5 is connected to the delivery portion 6 at an end 5b thereof on the side of the delivery port 3. Additionally, a chamfered portion 5a is formed at an edge of the feed port 2. An interval D1 between two sides which face each other among four sides which form the feed port 2 continuous with the introducing portion 5 is larger than the external diameter Dc of the cord C such that a proper gap is formed between the edge of the feed port 2 and the cord C to be fed into the feed port 2. This permits the cord C to be fed into the feed port 2 with an allowance.

The introducing portion 5 is formed such that the size of a cross-section vertical to the centerline 5c (or 5d) thereof is reduced gradually toward the delivery portion 6 from the feed port 2. Specifically, the interval between faces which face each other among four faces which form the introducing portion 5 shorted in a fixed ratio toward the delivery portion 6 from the feed port 2 in both the X-direction and the Z-direction. The interval between faces which face each other among four faces which form the introducing portion 5 becomes equal to the interval D2 between two faces which form the delivery portion 6 and face each other at the end 5b of the introducing portion on the side of the delivery portion 6. That is, all of the four faces which form the introducing portion 5 are flat faces.

Additionally, as shown in FIG. 3, the feed ports 2 of the plurality of guide holes 4 are arranged in a so-called zigzag pattern such that the positions of adjacent feed ports are shifted alternately in the Z-direction orthogonal to the X-direction. If another expression is used, the feed ports 2 are arranged in two rows in the Z-direction, and feed ports adjacent to each other in each row are arranged at twice the intervals P, i.e., at intervals 2P, in the X-direction. For this reason, as shown in FIG. 1, the centerline 5c of a certain introducing portion 5 inclines by a predetermined angle with respect to the centerline 6a of the delivery portion 6 continuous to the introducing portion 5. And the centerline 5d of an introducing portion 5 next to the introducing portion 5 inclines toward the side opposite the next introducing portion 5 by the above predetermined angle with respect to the centerline 6a of the delivery portion 6 continuous to the introducing portion 5.

Additionally, as shown in FIG. 1, the cord aligning device 1 is constituted by a feed-port-side member 7 in which the introducing portion 5 is formed, and a delivery-port-side member 8 in which the delivery portion 6 is formed. The feed-port-side member 7 is formed with a recess 7a, and the delivery-port-side member 8 is formed with a protrusion 8a engaged with the recess 7a. The feed-port-side member 7 is combined with the delivery-port-side member 8 by engaging the recess 7a with the protrusion 8a. By combining the feed-port-side member 7 with the delivery-port-side member 8, the introducing portion 5 is continuous with the delivery portion 6.

Next, the operation of the cord aligning device 1 will be described.

As shown in FIG. 1, a plurality of cords C are fed into the introducing portions 5 of the guide holes 4 through the feed ports 2, respectively. At this time, since the feed ports 2 of adjacent guide holes 4 are arranged such that their positions are shifted alternately in the Z-direction, the plurality of cords C are alternately inserted into the feed ports 2, respectively, from the direction of the centerline 5c of the introducing portion 5 or from the direction of the centerline 5d of the introducing portion 5. This enables a plurality of cords C to be easily fed into the cord aligning device 1, even in a case where the plurality of cords C are aligned with their intervals P narrowed.

Additionally, the interval D1 between two sides of the feed port 2 which face each other is larger than the external diameter Dc of the cord C so that the cord C can be fed into the feed port 2 with an allowance. This enables the cord C to be easily inserted into the feed port 2. In addition, the cord C is less likely to contact the edge of the feed port 2, and consequently, the stress to be caused in the cord C when the cord C which has contacted the edge of the feed port 2 is bent becomes small. As a result, the cord C can be prevented from contacting the edge of the feed port 2 and being broken.

In particular, since the feed ports 2 of adjacent guide holes 4 are arranged such that their positions are shifted alternately in the Z-direction, the introducing portions 5 of the adjacent guide holes 4 do not interfere with each other inside the device 1 even if the interval D1 between two sides of the feed port 2 which face each other is made larger than the interval P between adjacent guide holes 4. Accordingly, the size of the feed port 2 can be effectively increased, and thereby, breaking of the cord C can be prevented. Additionally, since the chamfered portion 5a is formed at the edge of the feed port 2, even if the cord C fed into the guide hole 4 through the feed port 2 contacts the edge of the feed port 2, the cord becomes difficult to break.

The cord C fed into the introducing portion 5 of the guide hole 4 through the feed port 2 is guided to the delivery portion 6 from the introducing portion 5. At this time, since the introducing portion 5 is formed such that the size of the cross-section thereof is reduced gradually toward the delivery portion 6 from the feed port 2, and is continuous with the delivery portion 6, the cord C is smoothly guided to the delivery portion 6 from the introducing portion 5 without receiving a strong resistance. At this time, since the inner surface of the introducing portion 5 inclines at a substantially uniform angle with respect to the centerline 5c (or the centerline 5d) of the introducing portion 5, the cord C can be more reliably guided without strong resistance.

If the inclination angle θ of the inner surface of the introducing portion 5 with respect to the centerline 5c (or the centerline 5d) of the introducing portion 5 is equal to or more than 1 degree and equal to or less than 45 degrees, the cord C is less likely to contact the edge of the feed port 2. This enables the cord C to be fed into the guide hole 4 without being broken and without receiving a strong resistance.

In addition, the interval D2 between two faces which face each other among four faces which form the end 5b of the introducing portion 5 (that is, the span length of the end 5b adjacent to the delivery portion 6) is equal to or more than 25% and equal to or less than 99% of the interval D1 (that is, the span length of the feed port 2) of two sides of the feed port 2 which face each other, the cord C can be more reliably fed into the guide hole 4 without breaking the cord and without strong resistance. Additionally, the guide holes 4 can be formed so that adjacent introducing portions 5 of the plurality of guide holes 4 may not interfere with each other.

Adjacent cords C guided to the delivery portions 6 from the introducing portions 5 are aligned while passing through the delivery portions 6, and are delivered through the delivery ports 3 from the guide holes 4. At this time, the delivery portions 6 extend in the Y-direction, and are arranged in one row in the X-direction at predetermined intervals P so as to form rows parallel to each other. The interval D2 between two faces which face each other among four faces which form each delivery portion 6 is substantially equal from the end of the delivery portion on the side of the feed port 2 to the delivery port 3, and is slightly larger than an external diameter Dc of the cord C. This enables the cords C to be delivered toward the Y-direction from the delivery ports' after the cords are aligned in the direction (X-direction) in which the delivery portions 6 are lined up at regular intervals.

In addition, if the length L2 of the delivery portions 6 is equal to or more than 10% and equal to or less than 70% of a total length L1 of the guide holes 4, the cords C can be smoothly guided to the delivery portions 6 from the introducing portions 5 without receiving a strong resistance. Additionally, in the delivery portions 6, the cords C can be more precisely aligned at regular intervals.

As a specific example, in a case where the cords C are aligned with the intervals P set to 1.0 millimeters, the cords C can be aligned with the standard deviation of the intervals P suppressed to 0.1 millimeter or less, without being broken, when the cord aligning device 1 constructed as mentioned above is used.

As described above, since the cord aligning device 1 is provided with the introducing portion 5 formed such that the size of the cross-section thereof is reduced gradually toward the delivery portion 6 from the feed port 2, and the guide hole 4 including the delivery portion 6 which is substantially equal to the size of the cross-section thereof over its total length and is formed in a linear fashion, a plurality of cords C can be inserted through the guide holes 4 without being broken. Additionally, a plurality of cords C can be more precisely aligned at regular interval P. Moreover, in manufacturing a beltlike material reinforced by the cords C, breaking of a plurality of cords C when the cords C are aligned can be prevented. As a result, the manufacturing efficiency of the beltlike material can be improved.

The cord aligning device 1 is constituted by the feed-port-side member 7 in which the introducing portion 5 is formed, and the delivery-port-side member 8 in which the delivery portion 6 is formed. In manufacturing the cord aligning device 1, the feed-port-side member 7 and the delivery-port-side member 8 are manufactured independently, and the feed-port-side member 7 is combined with the delivery-port-side member 8 by engaging the recess 7a with the protrusion 8a. By combining the feed-port-side member 7 with the delivery-port-side member 8, the introducing portion 5 is continuous with the delivery portion 6. This enables the guide hole 4 of a complicated shape as mentioned above to be easily formed inside the cord aligning device 1. In addition, the cord aligning device 1 is not limited to one which is split into two members including the feed-port-side member 7 and the delivery-port-side member 8. For example, the feed-port-side member 7 and the delivery-port-side member 8 may be further split in the Z-direction with the centerline 6a of the delivery portion 6 as a border.

Figure 4:
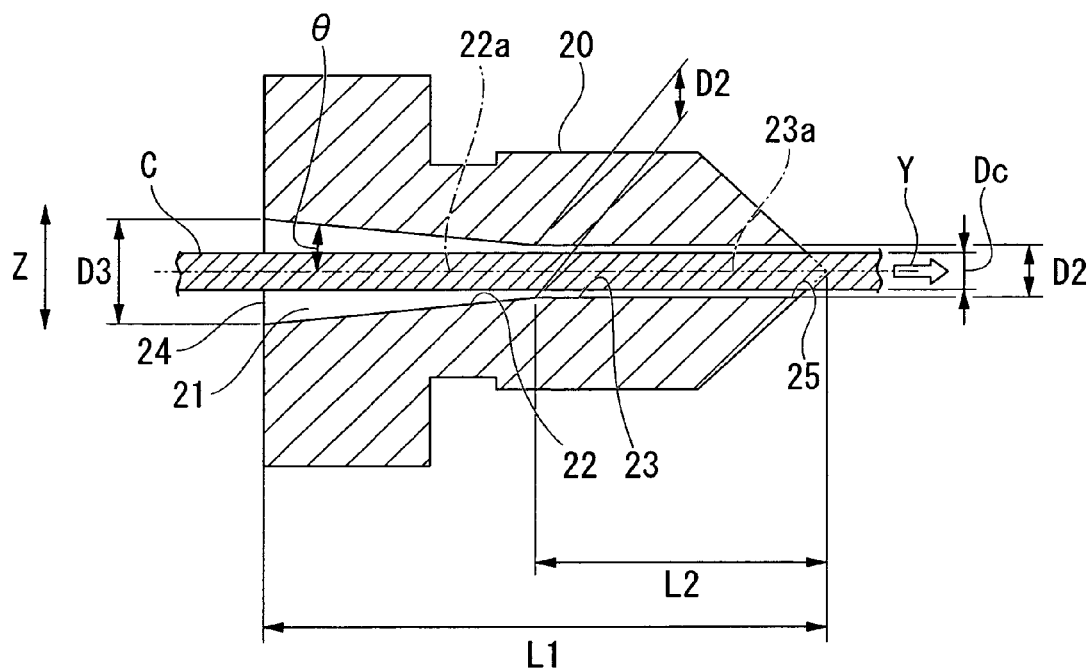
FIG. 4 is a sectional view showing a modification of the cord aligning device of the invention when the cord aligning device is seen from a Y-direction.
Figure 5:
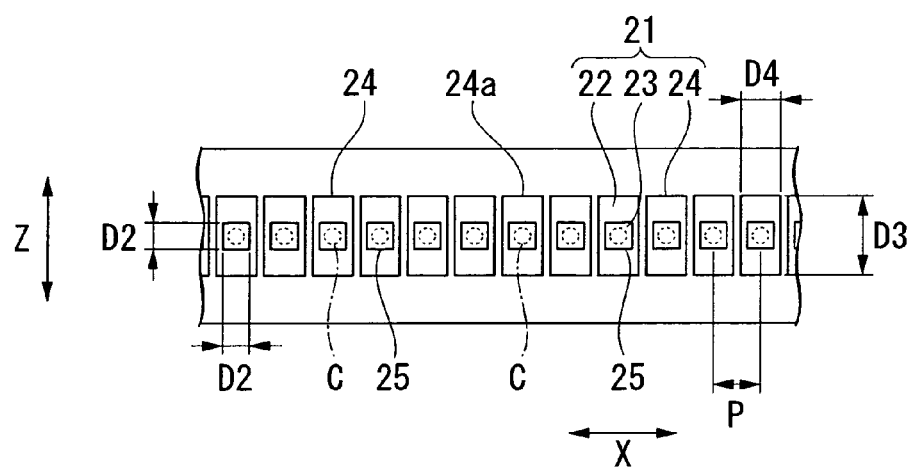
FIG. 5 is a side view showing the modification of the cord aligning device of the invention when the cord aligning device is seen from the Y-direction.

FIGS. 4 and 5 show a modification of the cord aligning device of the invention. As shown in FIGS. 4 and 5, a plurality of guide holes 21 are formed side-by-side in one row in the X-direction at predetermined intervals P in the cord aligning device 20 in this modification. Each guide hole 21 includes a feed port 24 into which the cord C is fed, a delivery port 25 from which a cord C is delivered, an introducing portion 22 provided continuously with the feed port 24, and a delivery portion 23 provided between the introducing portion 22 and the delivery port 25.

The delivery portion 23 is formed such that a cross-section vertical to a centerline 23a thereof has a square shape. The interval D2 between two faces which face each other among four faces which form the delivery portion 23 is substantially equal from the end of the delivery portion on the side of the feed port 24 to the delivery port 25 both in the X-direction and in the Y-direction, and is slightly larger than the external diameter Dc of the cord C. On the other hand, the delivery portion 22 is formed such that a cross-section vertical to the centerline 22a thereof has a rectangular shape which is long in the Z direction in the drawing. An interval D3 between two sides which are separated from each other in the Z-direction and face each other among four sides which form the feed port 24 continuous with the introducing portion 22 is larger than an interval D4 between two sides which are separated from each other and face each other in the X-direction. Additionally, the intervals D3 and D4 are larger than the external diameter Dc of the cord C such that a proper gap is formed between the edge of the feed port 2 and the cord C to be fed into the feed port 2. This permits the cord C to be fed into the feed port 2 with an allowance.

Moreover, the introducing portion 22 is formed such that the size of a cross-section vertical to the centerline 22a thereof is reduced gradually toward the delivery portion 23 from the feed port 24. Specifically, the interval between two sides which are separated from each other in the X-direction and face each other among four faces which form the introducing portion 22 shorted in a fixed ratio toward the delivery portion 23 from the feed port 24, and becomes equal to the interval D2 between two faces which form the delivery portion 23 and face each other at the end of the introducing portion on the side of the delivery portion 23. Additionally, the interval between two sides which are separated from each other in the Z-direction and face each other shorted in a fixed ratio different from that in the X-direction toward the delivery portion 23 from the feed port 24, and become equal to the interval D2 between two faces which form the delivery portion 23 and face each other at the end of the introducing portion on the side of the delivery portion 23. That is, all of the four faces which form the introducing portion 22 are flat faces. In addition, the centerline 22a of the introducing portion 22 does not incline with respect to the centerline 23a of the delivery portion 23 continuous with the introducing portion 22, but both the centerlines coincide with each other.

According to the cord aligning device 20 constructed as described above, a plurality of cords C can be inserted through the guide hole 21 without being broken. Additionally, a plurality of cords C can be more precisely aligned at regular intervals P. Moreover, in manufacturing a beltlike material reinforced by the cords C, breaking of a plurality of cords C when the cords C are aligned can be prevented. As a result, the manufacturing efficiency of the beltlike material can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in this embodiment, the cross-sectional shape of the guide hole is a rectangular shape. However, the cross-sectional shape may be a circular shape and an elliptical shape. Additionally, in this embodiment, the interval between faces which faces each other among four faces which form an introducing portion shorted in a fixed ratio toward a delivery portion from a feed port in both the X-direction and the Z-direction. However, the introducing portion may be formed such that the size of a cross-section vertical to the centerline thereof is reduced gradually toward the delivery portion from the feed port. That is, the angle of a slope may change in the middle of the introducing portion, or the slope may be bent. Otherwise, faces which form the introducing portion may have shapes obtained by combining flat faces and curved faces.

Industrial Applicability

The invention relates to a cord aligning device formed with a plurality of guide holes allowing cords to be separately inserted therethrough. Each of the guide holes include a feed port into which a cord is fed, a delivery port from which the cord is delivered, an introducing portion provided continuously with the feed port, and a delivery portion provided between the introducing portion and the delivery port. The introducing portion is formed such that the area of a cross-section vertical to a centerline thereof is reduced gradually toward the delivery portion from the feed port. The delivery portion is substantially equal in the area of a cross-section vertical to a centerline thereof over its total length, and is formed in a linear fashion. The delivery portions of the plurality of guide holes are juxtaposed in a predetermined direction so as to form rows parallel to each other.

According to the cord aligning device, a plurality of cords can be inserted through the guide holes without being broken.

The invention claimed is:

1. A cord aligning device comprising:
a plurality of penetrating holes allowing cords to be separately inserted there through, each of which including: a feed aperture provided at one end of the penetrating hole and pert into which a cord is fed; a delivery aperture provided at the other end of the penetrating hole and from which the cord is delivered;
an introducing portion provided continuously with the feed aperture;
a delivery portion provided between the introducing portion and the delivery aperture,
wherein the introducing portion is formed such that the area of a cross-section vertical to a centerline thereof is reduced gradually toward the delivery portion from the feed aperture,
the area of a cross-section of the delivery portion vertical to a centerline thereof is uniform along the centerline over its total length,
the delivery portion is formed in a linear fashion, and
the delivery portions of the plurality of penetrating holes are juxtaposed in a predetermined direction so as to form rows parallel to each other; and
wherein the cord aligning device includes a feed-aperture-side member in which the introducing portion is formed, and a delivery-aperture-side member in which the delivery portion is formed, and
the feed-aperture-side member is combined with the delivery-aperture-side member such that the introducing portion is continuous with the delivery portion.

2. The cord aligning device according to claim 1, wherein an inner surface of the introducing portion inclines at a substantially uniform angle with respect to the centerline of the introducing portion.

3. The cord aligning device according to claim 2, wherein the inclination angle of the inner surface of the introducing portion with respect to the centerline of the introducing portion is equal to or more than 1 degree and equal to or less than 45 degrees.

4. The cord aligning device according to claim 1, wherein the feed apertures of the plurality of penetrating holes are arranged such that the positions thereof are shifted alternately in a direction orthogonal to the predetermined direction.

5. The cord aligning device according to claim 1, wherein the edge of the feed aperture is chamfered.

6. The cord aligning device according to claim 1, wherein the span length of an end of the introducing portion adjacent to the delivery portion is equal to or more than 25% and equal to or less than 99% of the span length of the feed aperture.

7. The cord aligning device according to claim 1, wherein the length of the delivery portion is equal to or more than 10% and equal to or less than 70% of the total length of the guide hole.

* * * * *